(12) United States Patent
Vanier et al.

(10) Patent No.: US 6,916,368 B2
(45) Date of Patent: *Jul. 12, 2005

(54) CURABLE FILM-FORMING COMPOSITION EXHIBITING IMPROVED SCRATCH RESISTANCE

(75) Inventors: Noel R. Vanier, Wexford, PA (US); Calum H. Munro, Wexford, PA (US); James A. Claar, Apollo, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/360,255

(22) Filed: Feb. 6, 2003

(65) Prior Publication Data

US 2003/0162015 A1 Aug. 28, 2003

Related U.S. Application Data

(60) Provisional application No. 60/358,282, filed on Feb. 20, 2002.

(51) Int. Cl.$^7$ .................................................. B32B 5/16
(52) U.S. Cl. ............. 106/483; 106/287.17; 106/287.34; 428/329; 428/331; 524/437; 524/438; 524/493
(58) Field of Search ................................ 524/493, 437, 524/438, 560, 570, 492; 428/331, 328, 329; 106/287.17, 287.34, 483; 525/526.1

(56) References Cited

U.S. PATENT DOCUMENTS

| | | | |
|---|---|---|---|
| 3,986,997 A | 10/1976 | Clark | 260/29.2 M |
| 4,027,073 A | 5/1977 | Clark | 428/412 |
| RE30,450 E | 12/1980 | Iannicelli | 106/308 N |
| 4,239,738 A | 12/1980 | Richardson | 423/292 |
| 4,310,600 A | 1/1982 | Cross | 428/447 |
| 4,410,594 A | 10/1983 | Olson | 428/412 |
| 4,522,958 A | 6/1985 | Das et al. | 523/212 |
| 4,526,910 A | 7/1985 | Das et al. | 523/220 |
| 4,652,470 A | 3/1987 | Das et al. | 427/407.1 |
| 4,677,004 A | 6/1987 | Das et al. | 427/407.1 |
| 4,822,828 A | 4/1989 | Swofford | 522/84 |
| 5,385,960 A | 1/1995 | Emmons et al. | 523/205 |
| 5,686,012 A | 11/1997 | Hayashi et al. | 252/62.56 |
| 5,749,937 A | 5/1998 | Detering et al. | 75/10.19 |
| 5,853,809 A * | 12/1998 | Campbell et al. | 427/407.1 |
| 5,914,162 A | 6/1999 | Bilkadi | 428/35.8 |
| RE37,853 E * | 9/2002 | Detering et al. | 75/10.19 |
| 6,770,705 B2 * | 8/2004 | Vanier et al. | 524/560 |

FOREIGN PATENT DOCUMENTS

| | | |
|---|---|---|
| JP | 59-043071 | 3/1984 |
| JP | 9-165450 | 6/1997 |
| WO | WO 01/09260 | 2/2001 |

\* cited by examiner

Primary Examiner—H. Thi Le
(74) Attorney, Agent, or Firm—William J. Uhl

(57) ABSTRACT

A curable film-forming composition is provided that on curing produces a coating, comprising in a medium (i) 10 to 90 percent by weight based on the total weight of resin solids in the film-forming composition of a crosslinking agent; (ii) 10 to 90 percent by weight based on the total weight of resin solids in the film-forming composition of a polymer containing a plurality of functional groups reactive with the crosslinking agent; and (iii) 20 to 85 percent by volume based on the total volume of the film-forming composition of particles having a mean particle size less than 100 nm. The particles further have an index of refraction sufficiently similar to that of the polymer of (ii) to minimize haze, and have an affinity for the medium sufficient to keep the particles suspended therein. The affinity of the particles for the medium is greater than the affinity of the particles for each other, thereby preventing agglomeration of the particles within the medium. The film-forming compositions exhibit improved scratch (mar) resistance compared to compositions of the prior art, as well as improved sag resistance when compared to similar coating compositions prepared without the particles.

A multi-component composite coating composition is also provided. The coating composition comprises a pigmented film-forming composition serving as a base coat and a clear film-forming composition serving as a transparent topcoat over the base coat. The transparent topcoat, or clear coat, is derived from the curable film-forming composition described above.

40 Claims, No Drawings

CURABLE FILM-FORMING COMPOSITION EXHIBITING IMPROVED SCRATCH RESISTANCE

CROSS-REFERENCE TO RELATED APPLICATION

This application claims priority under 35 U.S.C. § 119 to Provisional Application Ser. No. 60/358,282, filed Feb. 20, 2002.

FIELD OF THE INVENTION

The present invention relates to novel curable film-forming compositions containing submicron-sized particles and having improved scratch (mar) resistance, and multi-component composite coating compositions comprising a pigmented or colored base coat and a transparent or clear topcoat.

BACKGROUND OF THE INVENTION

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image. The clear coat is particularly important for these properties.

Topcoat film-forming compositions, particularly those used to form the transparent clear coat in color-plus-clear coating systems for automotive applications, are subject to defects that occur during the assembly process as well as damage from numerous environmental elements. Such defects during the assembly process include paint defects in the application or curing of the base coat or the clear coat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Typically, a harder more highly crosslinked film may exhibit improved scratch resistance, but it is less flexible and much more susceptible to chipping and/or thermal cracking due to embrittlement of the film resulting from a high crosslink density. A softer, less crosslinked film, while not prone to chipping or thermal cracking, is susceptible to scratching, waterspotting, and acid etch due to a low crosslink density of the cured film.

Further, elastomeric automotive parts and accessories, for example elastomeric bumpers and hoods, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature ($T_g$). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

Prior art attempts to improve mar resistance have also included the addition of micron- and submicron-sized particles such as colloidal silica to coating compositions. Such particles typically have highly active (and reactive) surfaces, often due to surface treatments, and as a result the particles tend to agglomerate during production thereof or during incorporation into the coating composition. Agglomeration of the particles prevents high loading of the particles into a coating composition because the viscosity of the composition increases unacceptably. Additionally, agglomeration of the particles may affect the optical properties of the coating, reducing the gloss and clarity thereof because of light scattering.

A number of patents teach the use of a coating comprising a dispersion of colloidal silica in an alcohol-water solution of a partial condensate of a silanol of the formula $RSi(OH)_3$ wherein at least 70 weight percent of the partial condensate is the partial condensate of $CH_3Si(OH)_3$. Representative, nonlimiting examples are U.S. Pat. Nos. 3,986,997, 4,027,073, 4,239,738, 4,310,600 and 4,410,594.

U.S. Pat. No. 4,822,828 teaches the use of a vinyl functional silane in an aqueous, radiation curable, coating composition which comprises: (a) from 50 to 85 percent, based on the total weight of the dispersion, of a vinyl functional silane, (b) from 15 to 50 percent, based on the total weight of the dispersion of a multifunctional acrylate, and (c) optionally, from 1 to 3 weight percent of a photoinitiator. The vinyl-functional silane is the partial condensate of silica and a silane, such that at least sixty percent of the silane is a vinyl-functional silane conforming to the formula $(R)_a Si(R')_b(R'')_c$ wherein R is allyl or vinyl functional alkyl; R' is hydrolyzable alkoxy or methoxy; R" is non-hydrolyzable, saturated alkyl, phenyl, or siloxy, such that $a+b+c=4$; and $a \geq 1$; $b \geq 1$; $c \geq 0$. The patent discloses that these coating compositions may be applied to plastic materials and cured by exposure to ultraviolet or electron beam irradiation to form a substantially clear, abrasion resistant layer.

Similarly, U.S. Pat. No. 5,914,162 teaches the use of colloidal inorganic oxide particles in a radiation-curable coating composition comprising non-silyl polyethylenically unsaturated monomers and oligomers. The coatings exhibit abrasion resistance.

U.S. Pat. No. 5,686,012 describes modified particles comprising inorganic colored and/or magnetic particles as core particles, and at least one polysiloxane modified with at least one organic group which is coated on the surfaces of the core particles. The patent also discloses a water-based paint comprising a paint base material and the modified particles as the pigment as well as a process for producing the modified particles.

U.S. Pat. No. Reissue 30,450 discloses finely divided particulate inorganic pigments surface modified with an amino organosilane. Thermosetting resins incorporating such pigments exhibit improved physical properties, such as abrasion resistance.

U.S. Pat. No. 5,853,809 discloses clear coats in color-plus-clear systems which have improved scratch resistance due to the inclusion in the coating composition of inorganic particles such as colloidal silicas which have been surface modified with a reactive coupling agent via covalent bonding.

Despite recent improvements in color-plus-clear coating systems, there remains a need in the automotive coatings art for topcoats having good initial scratch resistance as well as enhanced retained scratch resistance without embrittlement of the film due to high crosslink density.

SUMMARY OF THE INVENTION

In accordance with the present invention, a curable film-forming composition is provided that on curing produces a coating, comprising in a medium (i) 10 to 90 percent by weight based on the total weight of resin solids in the film-forming composition of a crosslinking agent; (ii) 10 to 90 percent by weight based on the total weight of resin solids in the film-forming composition of a polymer containing a plurality of functional groups reactive with the crosslinking agent; and (iii) 20 to 85 percent by volume based on the total volume of the film-forming composition of particles having a mean particle size less than 100 nm. The particles further have an affinity for the medium sufficient to keep the particles suspended therein. The affinity of the particles for the medium is greater than the affinity of the particles for each other, thereby preventing agglomeration of the particles within the medium. Upon application to a substrate and after curing, the curable film-forming compositions of the present invention provide excellent scratch resistance as well as retained scratch resistance (after simulated weathering). The compositions additionally provide acceptable sag control during application to a substrate without adversely affecting other appearance or physical properties of the cured coating. When the composition is applied to a vertically oriented substrate having one or more punched holes with a diameter of 0.25 in (0.635 cm), and heated to a temperature and for a time sufficient to effect cure, the average sag measured from the bottom of a punched hole is less than that of a similar cured coating without the particles.

A multi-component composite coating composition is also provided. The coating composition comprises a pigmented film-forming composition serving as a base coat and a clear film-forming composition serving as a transparent topcoat over the base coat. The transparent topcoat, or clear coat, is derived from the curable film-forming composition described above.

Also provided are coated substrates on which the curable coating compositions or the multi-component composite coating compositions are applied and cured to form a cured coating; the cured coating having a thickness of at least 5 microns.

DETAILED DESCRIPTION

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Film-forming compositions of the present invention comprise 10 to 90 percent by weight, based on the total weight of resin solids in the film-forming composition, of a crosslinking agent as component (i). Examples of suitable crosslinking agents include any known crosslinking agents useful in curable film-forming compositions such as aminoplasts, polycarboxylic acids and anhydrides, polyisocyanates, polyols, and polyepoxides.

Aminoplasts are obtained from the reaction of formaldehyde with an amine or amide. The most common amines or amides are melamine, urea, or benzoguanamine. However, condensates with other amines or amides can be used. While the aldehyde used is most often formaldehyde, other aldehydes such as acetaldehyde, crotonaldehyde, and benzaldehyde may be used.

The aminoplast contains methylol groups and usually at least a portion of these groups are etherified with an alcohol to modify the cure response. Any monohydric alcohol may be employed for this purpose including methanol, ethanol, and isomers of butanol and hexanol.

Most often, the aminoplasts are melamine-, urea-, or benzoguanamine-formaldehyde condensates etherified with an alcohol containing from one to four carbon atoms.

Examples of polycarboxylic acids that are suitable for use as the crosslinking agent (i) in the composition of the present invention include those described in U.S. Pat. No. 4,681,811, at column 6, line 45 to column 9, line 54. Suitable polyanhydrides include those disclosed in U.S. Pat. No. 4,798,746, at column 10, lines 16–50, and in U.S. Pat. No. 4,732,790, at column 3, lines 41 to 57.

Polyisocyanate crosslinking agents may be used in the composition of the present invention and are typically at least partially capped. Usually the polyisocyanate crosslinking agent is a fully capped polyisocyanate with substantially no free isocyanate groups. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates include 4,4'-diphenylmethane diisocyanate and toluene diisocyanate. Examples of suitable aralkyl diisocyanates are meta-xylylene diisocyanate and α,α,α',α'-tetramethylmeta-xylylene diisocyanate Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and secondary amines such as dibutyl amine.

Polyols may be used as crosslinking agents for anhydride functional polymers and include those disclosed in U.S. Pat. No. 4,046,729, at column 7, line 52 to column 8, line 9; column 8, line 29 to column 9, line 66; and in U.S. Pat. No. 3,919,315, at column 2, line 64 to column 3, line 33.

Polyepoxides may be used as crosslinking agents for carboxylic acid functional polymers and include those described in U.S. Pat. No. 4,681,811, at column 5, lines 33–58.

The crosslinking agent (i) typically is present in the curable film-forming composition of the present invention in an amount ranging from at least 10 percent by weight, preferably at least 25 percent by weight based on the total weight of resin solids in the film-forming composition. The crosslinking agent (i) also typically is present in the curable film-forming composition of the present invention in an amount less than 90 percent by weight, preferably less than 75 percent by weight, based on the total weight of resin solids in the curable film-forming composition. The amount of crosslinking agent (i) present in the curable film-forming composition of the present invention can range between any combination of these values inclusive of the recited values.

The polymers that can be used as component (ii) in the film-forming composition of the present invention may be selected from at least one of acrylic, polyester, polyurethane, and polyether polymers. Note that by "polymers" is meant polymeric materials, oligomeric materials, copolymers, and homopolymers of various monomers. The polymers contain a plurality of functional groups that are reactive with the crosslinking agent of (i), for example hydroxyl, carboxyl, carbamate, epoxy and/or amide functional groups.

Suitable functional group-containing acrylic polymers include those prepared from one or more alkyl esters of acrylic acid or methacrylic acid and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate and 2-ethylhexyl acrylate. Ethylenically unsaturated carboxylic acid functional monomers, for example acrylic acid and/or methacrylic acid or anhydride, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate.

The acrylic polymers may contain hydroxyl functionality which can be incorporated into the acrylic polymer through the use of hydroxyl functional monomers such as hydroxyethyl acrylate, hydroxypropyl acrylate, hydroxyethyl methacrylate and hydroxypropyl methacrylate which may be copolymerized with the other acrylic monomers mentioned above.

The acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those commercially available from Shell Chemical Company under the trademark CARDURA® E; and from Exxon Chemical Company under the trademark GLYDEXX®-10.

Alternatively, the beta-hydroxy ester functional monomers are prepared from an ethylenically unsaturated, epoxy functional monomer, for example glycidyl methacrylate and allyl glycidyl ether, and a saturated carboxylic acid, such as a saturated monocarboxylic acid, for example, isostearic acid.

The acrylic polymer is typically prepared by solution polymerization techniques in the presence of suitable initiators such as organic peroxides or azo compounds, for example, benzoyl peroxide or N,N-azobis(isobutyronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth)acrylate and allyl glycidyl ether, with one or more ethylenically unsaturated monomers that are free of epoxide functionality, e.g., methyl (meth)acrylate, isobornyl (meth)acrylate, butyl (meth)acrylate and styrene. Examples of epoxide functional ethylenically unsaturated monomers that may be used in the preparation of epoxide functional acrylic polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

The functional group-containing acrylic polymer typically has a $M_n$ ranging from 500 to 30,000 and preferably from 1000 to 5000. The acrylic polymer typically has a calculated functional group equivalent weight typically within the range of 15 to 150, and preferably less than 50, based on equivalents of reactive functional groups.

Non-limiting examples of functional group-containing polyester polymers suitable for use as the polymer (ii) in the curable film-forming composition of the present invention can include linear or branched polyesters having hydroxyl, epoxy, carboxyl anhydride, and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Amide functionality may be introduced to the polyester polymer by using suitably functional reactants in the preparation of the polymer, or by converting other functional groups to amido-groups using techniques known to those skilled in the art. Likewise, other functional groups may be incorporated as desired using suitably functional reactants if available or conversion reactions as necessary.

The functional group-containing polyester polymer typically has a $M_n$ ranging from 500 to 30,000, preferably about 1000 to 5000. The polyester polymer typically has a calculated functional group equivalent weight within the range of 15 to 150, preferably 20 to 75, based on equivalents of reactive pendent or terminal functional groups.

Non-limiting examples of suitable polyurethane polymers having pendent and/or terminal functional groups include the polymeric reaction products of polyols, which are prepared by reacting the polyester polyols or acrylic polyols, such as those mentioned above, or polyether polyols, such as those mentioned below, with a polyisocyanate such that the OH/NCO equivalent ratio is greater than 1:1 such that free hydroxyl groups are present in the product. Alternatively, isocyanate functional polyurethanes may be prepared using similar reactants in relative amounts such that the OH/NCO equivalent ratio is less than 1:1. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include one or more aliphatic or aromatic diisocyanates or higher polyisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Amide functionality may be introduced to the polyurethane polymer by using suitably functional reactants in the preparation of the polymer, or by converting other functional groups to amido- groups using techniques known to those skilled in the art. Likewise, other functional groups may be incorporated as desired using suitably functional reactants if available or conversion reactions as necessary.

The functional group-containing polyurethane polymers typically have a $M_n$ ranging from 500 to 20,000, preferably from 1000 to 5000. The polyurethane polymer typically has a functional equivalent weight within the range of 15 to 150, preferably 20 to 75, based on equivalents of reactive pendent or terminal functional groups.

Non-limiting examples of functional group-containing polyether polymers suitable for use as the polymer (ii) in the curable film-forming composition of the present invention can include linear or branched polyethers having hydroxyl, epoxy and/or carbamate functionality.

Examples of polyether polyols are polyalkylene ether polyols which include those having the following structural formulae (I) and (II):

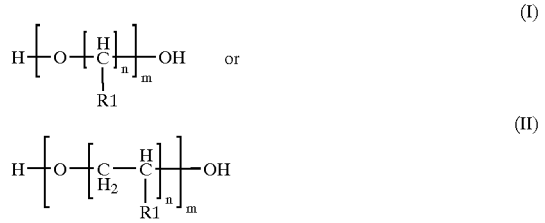

where the substituent R1 is hydrogen or lower alkyl containing from 1 to 5 carbon atoms including mixed substituents, n is typically from 2 to 6, and m is from 8 to 100 or higher. Note that the hydroxyl groups, as shown in structures (I) and (II) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE® and TERACOL®, available from E. I. Du Pont de Nemours and Company, Inc. and POLYMEG®, available from Q O Chemicals, Inc., a subsidiary of Great Lakes Chemical Corp.

Suitable carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Amide functionality may be introduced to the polyether polymer by using suitably functional reactants in the preparation of the polymer, or by converting other functional groups to amido-groups using techniques known to those skilled in the art. Likewise, other functional groups may be incorporated as desired using suitably functional reactants if available or conversion reactions as necessary.

Suitable functional group-containing polyether polymers preferably have a number average molecular weight ($M_n$) ranging from 500 to 30,000 and more preferably from 1000 to 5000. The polyether polymers have a functional equivalent weight of within the range of 15 to 150, preferably 25 to 75, based on equivalents of reactive pendent and/or terminal functional groups and the solids of the polyether polymer.

In one embodiment, the functional group-containing polymer preferably has a glass transition temperature ($T_g$) of less than 30° C., typically less than 0° C., often less than −20° C.; the $T_g$ being determined by differential scanning calorimetry (DSC). Such polymers form cured coatings which are susceptible to scratching. However, incorporating the particles of the present invention into the curable compositions prepared with such functional group-containing polymers significantly increases the scratch resistance.

The functional group-containing polymer (ii) typically is present in the curable film-forming composition of the present invention in an amount ranging from at least 10 percent by weight, preferably at least 25 percent by weight, based on the total weight of resin solids in the film-forming composition. The functional group-containing polymer (ii) also typically is present in the curable film-forming composition of the present invention in an amount less than 90 percent by weight, preferably less than 75 percent by weight, based on the total weight of resin solids in the film-forming composition. The amount of the functional group-containing polymer (ii) present in the curable film-forming composition of the present invention can range between any combination of these values inclusive of the recited values.

The curable film-forming composition of the present invention further comprises (iii) sub-micron sized particles present in an amount of 20 to 85 percent by volume based on the total volume of the film-forming composition. The particles typically have a mean particle size less than 100 nm, often less than 50 nm, more often less than 20 nm. The particles typically have a mean particle size greater than 1 nm. The average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and determine particle size based on the magnification. The diameter of the particle refers to the smallest diameter sphere that will completely enclose the particle.

It will be recognized by one skilled in the art that mixtures of one or more particles having different average particle sizes can be incorporated into the compositions in accordance with the present invention to impart the desired properties and characteristics to the compositions. For example, particles of varying particle sizes can be used in the compositions according to the present invention. When the particle size distribution is substantially bimodal, particles are typically present in an amount up to 85 percent by volume based on the total volume of the film-forming composition. When the particle size distribution is substantially monodisperse, particles are typically present in an amount up to 75 percent by volume based on the total volume of the film-forming composition.

In one embodiment of the invention, the particles (iii) further have an index of refraction (n) that is greater than or less than that of the mixture of crosslinking agent (i) and polymer (ii) by an amount less than $\Delta n_{max}$, defined below.

$\Delta n_{max}$, the maximum difference in refractive index between the particles (iii) and the mixture of crosslinking agent (i) and polymer (ii), is dependent on the size (diameter, d) in nm of the particles (iii) and is determined according to the equation:

$$\Delta n_{max} = H/d^2$$

where H is an allowable haze factor.

For a film forming composition that is substantially free from haze, H should be less than 200, preferably less than 133, more preferably less than 41. For example, if the size (d) of particles (iii) is 20 nm, $\Delta n_{max}$ is preferably less than 0.333, more preferably less than 0.103, while if the size (d) of particles (iii) is 75 nm, $\Delta n_{max}$ is preferably less than 0.024, more preferably less than 0.007.

Typically the refractive index of the particles ranges between 1.45 and 1.80. The particles are also substantially colorless. Such optical properties allow for the use of the particles in film-forming compositions, particularly clear film-forming compositions, without affecting the gloss or transparency thereof. Therefore, the composition is particularly suitable for use in applications requiring excellent appearance properties, such as in automotive applications.

The particles have an affinity for the medium of the composition sufficient to keep the particles suspended therein. The affinity of the particles for the medium is greater than the affinity of the particles for each other, thereby preventing agglomeration of the particles within the medium. This property is due to the nature of the particles themselves. The particles are prepared such that they are substantially free of functional groups, such as hydroxyl groups, on the particle surface. The particles are also substantially free of any surface treatment. Such characteristics distinguish the particles used in the composition of the present invention from conventional particles such as colloidal silica commonly used in the coatings industry. Conventional particles, which are usually surface treated and are highly surface active due to the presence of functional groups on the surface thereof, tend to agglomerate during their preparation or upon addition to a composition. For this reason, conventional particles such as-colloidal silica need to be suspended in a liquid medium prior to addition to a coating composition. In contrast, the particles used in the composition of the present invention may be added to the composition neat during the formulation thereof, and may be added at high loadings without appreciable viscosity increases, allowing for formulation of high solids coating compositions.

The shape (or morphology) of the particles can vary depending upon the specific embodiment of the present invention and its intended application. For example, generally spherical morphologies can be used, as well as particles that are cubic, platy, or acicular (elongated or fibrous). In general, the particles are substantially spherical in shape.

The particles (iii) used in the composition of the present invention comprise one or more metal oxides. In one embodiment, the particles (iii) may be a complex metal oxide comprising a homogeneous mixture, or solid state solution of two or more (up to x) metal oxides, labeled MO1, MO2, . . . , MOx, having an effective refractive index ($n_{eff}$) that is closely approximated as a volume average of the refractive indices of the component metal oxides, determined according to the equation:

$$n_{eff} = (c_{MO1} \cdot n_{MO1}/\rho_{MO1}) + (c_{MO2} \cdot n_{MO2}/\rho_{MO2}) + \ldots + (c_{MOx} \cdot n_{MOx}/\rho_{MOx})$$

where $n_{MO1}$, $n_{MO2}$, . . . , $n_{MOx}$ are the respective refractive indices of the metal oxides, MO1 MO2, . . . , MOx; $c_{MO1}$, $c_{MO2}$, . . . , $c_{MOx}$ are the weight fractions of the metal oxides, MO1, MO2, . . . , MOx; and $\rho_{MO1}$, $\rho_{MO2}$, . . . , $\rho_{MOx}$, are the respective densities of the metal oxides, MO1, MO2, . . . , MOx.

For example, amorphous silica has a refractive index of about 1.46 and a density of about 2.2, and alumina has a refractive index of about 1.76 and a density of about 4.0. A mixed metal oxide comprising 60 weight percent silica and 40 weight percent alumina would have an effective refractive index of approximately 1.54.

The metal oxides may be selected from at least one of aluminum oxide, zinc oxide, zirconium oxide and silicon dioxide. When the metal oxides are mixed; i. e., more than one type of metal oxide is used, they typically form a homogeneous mixture within the particle. The particles may further comprise one or more carbides such as silicon carbide; nitrides such as silicon nitride, aluminum nitride and boron nitride present at a total of up to 100 percent by weight, based on the total weight of the particles. The particles most often comprise 10 to 70 percent by weight aluminum oxide and 30 to 90 percent by weight silica.

The particles used in the film-forming composition of the invention may be prepared by reacting together the metal oxide precursors and any other ingredients in any of a variety of processes. The particles may be prepared by a process comprising: (a) introducing reactants into a reaction chamber; (b) rapidly heating the reactants by means of a plasma to a selected reaction temperature sufficient to yield a gaseous reaction product; (c) preferably passing the gaseous reaction product through a restrictive convergent-divergent nozzle to effect rapid cooling, or utilizing an alternative cooling method such as a cool surface or quenching gas, and (d) condensing the gaseous reaction product to yield ultrafine solid particles. One process for preparing the particles (iii) is fully described in U.S. Pat. No. 5,749,937. The process comprises: (a) introducing a reactant stream (in the case of the particles used in the composition of the present invention, comprising the one or more metal oxide precursors) into one axial end of a reaction chamber; (b) rapidly heating the reactant stream by means of a plasma to a selected reaction temperature as the reactant stream flows axially through the reaction chamber, yielding a gaseous reaction product; (c) passing the gaseous reaction product through a restrictive convergent-divergent nozzle arranged coaxially within the end of the reaction chamber to rapidly cool the gaseous reaction product adiabatically and isentropically as the gaseous reaction product flows through the nozzle, retaining a desired end product within the flowing gaseous stream; and (d) subsequently cooling and slowing the velocity of the desired end product exiting from the nozzle, yielding ultrafine solid particles.

Suitable reactants to be used as part of the reactant stream include zinc oxide, aluminum oxide, zirconium dioxide, silicon dioxide, boron oxide or hydride, nitrogen and methane. The reactant stream may be introduced to the reaction chamber as a solid, liquid, or gas, but is usually introduced as a solid.

Usually the film-forming composition will also preferably contain catalysts to accelerate the cure of the crosslinking agent (i) and polymer (ii). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. Suitable catalysts for other crosslinking agents may used when necessary as known to those skilled in the art. The catalyst is usually present in an amount of about 0.05 to about 5.0 percent by weight, preferably about 0.08 to about 2.0 percent by weight, based on the total weight of resin solids in the film-forming composition.

Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40% by weight based on the total weight of resin solids.

The film-forming composition of the present invention may be a solid particulate (powder) composition or a liquid composition. It is most often a liquid composition.

The film-forming composition of the present invention is preferably used as the clear coat layer in a multi-component composite coating composition such as a "color-plus-clear" coating system, which includes at least one pigmented or colored base coat and at least one clear topcoat. The film-forming composition of the base coat in the color-plus-clear system may be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be any solventborne or waterborne composition known in the art. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat.

The base coat contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to 5 mils (0.254 to 127 microns), preferably 0.1 to 2 mils (2.54 to 50.8 microns) in thickness.

After application of the base coat to the substrate, a film is formed on the surface of the substrate by driving solvent, i. e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterbased compositions, but in general a drying time of from about 1 to 5 minutes at a temperature of about 80–250° F. (20–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clear coat is usually from about 0.2–5 mils (5.08 to 127 microns), preferably 1.2–3 mils (30.5 to 76.2 microns).

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

The coatings formed from the cured compositions according to the present invention can have outstanding appearance properties and initial scratch (mar) resistance properties, as well as post-weathering or "retained" scratch (mar) resistance, which can be evaluated by measuring the gloss of coated substrates before and after abrading of the coated substrates.

The initial 20° gloss of a coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas AATCC Scratch Tester, Model CM-5, available from Atlas Electrical Devices Company of Chicago, Ill. The abrasive paper is 3M 281Q WETORDRY™ PRODUCTION™ 9 micron and 2 micron polishing paper sheets, which are commercially available from 3M Company of St. Paul, Minn. Panels are then rinsed with tap water and carefully patted dry: with a paper towel. The 20° gloss is measured on the scratched area of each test panel. The number reported is the percent of the initial gloss retained after scratch testing, i.e., 100%×scratched gloss/initial gloss.

Coated substrates prepared using the compositions of the present invention typically have a post-weathering or "retained" scratch resistance value such that after scratch testing, greater than 45 percent, preferably greater than 50 percent, more preferably greater than 70 percent of initial 20° gloss is retained.

Moreover, the cured topcoat of the present invention can have a retained scratch resistance such that greater than 50 percent of initial 20° gloss is retained after weathering. This measurement is done using the scratch test method described above after the unscratched test panels were subjected to simulated weathering according to ASTM D-1499-64. The exposure device is a Weather-O-Meter®, Type DMC, Serial Number WO-1305. The type of light source is a twin carbon arc lamp enclosed in a fused silica globe. The operating black panel temperature is 140° F. (60° C.). The spray of water is deionized water at a temperature of about 70° F. (21° C.). The number and type of spray nozzles which are used are four No. 50 nozzles.

In certain embodiments, the cured composition or coating of the present invention has an initial 20° gloss (as measured using a 20° NOVO-GLOSS 20 statistical glossmeter, available from Gardner Instrument Company) of greater than 70, can be greater than 75, and is often greater than 80. This high gloss composition can be curable under ambient or thermal conditions.

In addition to scratch resistance, sag resistance is significantly improved through the use of the curable film-forming compositions of the present invention, whether as a monocoat or as a base coat and/or clear coat in a color-plus-clear composite coating. The determination of sag resistance of a coating may be performed as follows:

1) A substrate is provided, having one or more punched holes with a diameter of 0.25 in (0.635 cm).
2) The substrate is oriented vertically and the coating is applied to the substrate at the desired film thickness.
3) The coated substrate is flashed and baked in an appropriate manner at a temperature and for a time sufficient to effect cure.
4) The length of the sag from the bottom of each hole in the panel is measured and recorded. An average is determined.

For the composition of the present invention, the average sag measured from the bottom of a punched hole is significantly less than a similar cured coating composition without the particles.

EXAMPLES

Four coating compositions (Examples A–D) were prepared. Example A was based on a hydroxyl-containing acrylic polymer melamine-formaldehyde curing agent and sag control agent. Example B was similar to Example A but without the sag control agent. Example C was similar to Example B but with 5% by weight aluminum silicate nanoparticles. The nanoparticles had a refractive index of 1.519, a mean particle size of 74 nm and were substantially spherical, colorless, free of surface hydroxyl groups and substantially free of surface treatment. Example D was similar to Example C, but the composition contained 40% by weight (25.1% by volume) aluminum silicate microparticles. The formulations for Examples A–D are shown in Table 1 below. In Examples C and D, the nanoparticles were suspended in that they did not agglomerate while the coating composition was being evaluated.

The formulations were applied as clear coats over base coated panels, cured and evaluated for gloss and Haze when the coatings were cured in the horizontal (HOR) and vertical (VERT) positions, see Table 2. The cured coatings were also evaluated for sag. See Table 3 that correlates sag with percent solids of the coating compositions. The cured coatings were also evaluated for Mar resistance and the results are reported in Table 4.

TABLE 1

| Ingredients | Parts by Weight (solid grams) | | | |
|---|---|---|---|---|
| | A | B | C | D |
| Acrylic Polymer[1] | 66.4 | 66.4 | 66.4 | 66.4 |
| Aluminum Silicate[2] | 0 | 0 | 5.0 | 40.0 |
| Solsperse 32500[3] | 0 | 0 | 0.001 | 0.007 |
| Setalux C71761[4] | 1.6 | 0 | 0 | 0 |
| Setamine US-138[5] | 29.0 | 29.0 | 29.0 | 29.0 |
| Cylink 2000[6] | 4.6 | 4.6 | 4.6 | 4.6 |
| Catalyst 600[7] | 0.50/100 rs | 0.50/100 rs | 0.50/100 rs | 0.50/100 rs |
| Worlee 315[8] | 0.05/100 rs | 0.05/100 rs | 0.05/100 rs | 0.05/100 rs |
| Tinuvin 928[9] | 2.0/100 rs | 2.0/100 rs | 2.0/100 rs | 2.0/100 rs |
| Tinuvin 292[10] | 0.80/100 rs | 0.80/100 rs | 0.80/100 rs | 0.80/100 rs |

[1]The acrylic polymer was prepared with Hydroxyethyl Methacrylate, Cardura E/Acrylic Acid, Styrene, 2-Ethyl Hexyl Acrylate and reduced to 65% solids with Aromatic 100.
[2]The aluminum silicate from NanoProducts, lot # BPT0104-1 was dispersed into the acrylic polymer containing Solsperse 32500. (A paste of the acrylic polymer, aluminum silicate nanoparticles and about 120 grams of zircoa beads, and some solvent (Aromatic 100) was hand mixed in an 8 oz jar until it reached a putty like viscosity. Solsperse 32500 was added to drop the viscosity and provide for the wetting out of the nanoparticles. The 8 oz jar was wrapped in tape, a heavy plastic film was used to cover the top and protect the top that was also taped down to seal and hold. The viscosity was low enough that the grind media would flow. This mixture was put on a paint shaker for about 5 hours. After this time, Aromatic 100 solvent was added to help make the paste easily filterable to remove the grind media. After another 1–2 hours on the paint shaker, the formulation was filtered.)
[3]The Solsperse 32500 dispersant is commercially available from Avecia.
[4]The Setalux C71761 is a sag control agent dispersed in acrylic polymer commercially available from Akzo Nobel.
[5]The Setamine US-138 is a melamine-formaldehyde crosslinking agent commercially available from Akzo Nobel.
[6]The Cylink 2000 is an auxiliary crosslinking agent commercially available from Cytec Industries.
[7]The Catalyst 600 is an acid catalyst commercially available from Cytec Industries.
[8]The Worlee 315 is a silicone additive commercially available from Worlee Chemie.
[9]The Tinuvin 928 is a UV light absorber commercially available from Ciba Specialty Chemicals.
[10]The Tinuvin 292 is a hindered amine light stabilizer commercially available from Ciba Specialty Chemicals.

Clearcoat compositions were prepared by mixing the ingredients in the order given and reducing to spray viscosity (28 seconds, #4 Ford cup) with Aromatic 100 solvent. This material was spray applied over prebaked basecoat panels by an automatic spraymation unit and baked for 30 minutes at 285° F. to give 1.8 mils (43 microns) dry film thickness. Duplicate panels were sprayed in order to evaluate both horizontal and vertical baking positions. The black metallic waterborne basecoat (Obsidian Schwartz EWB type) was spray applied over steel panels primed with ED5000 electrocoat/1177225A primer/surfacer available from PPG Industries and prebaked for 10 minutes at 176° F. to give 0.5 mils dry film thickness.

In the Tables that follow, the % Solids were measured, in triplicate, by measuring the weight of solid material left after baking a 0.5 gram clearcoat sample plus 3 mL xylene for 60 minutes at 230° F. The cured coatings were evaluated for appearance ratings using the Byk-Gardner Haze/Gloss meter (20 degree gloss). Sag resistance and Mar resistance were determined as described above. For Mar resistance, the average of two runs was recorded.

TABLE 2

| Example | HOR/VERT | Gloss | Haze |
|---|---|---|---|
| A | HOR | 96 | 23 |
| B | HOR | 94 | 18 |
| C | HOR | 84 | 110 |
| D | HOR | 42 | 319 |
| A | VERT | 96 | 20 |
| B | VERT | 94 | 22 |
| C | VERT | 84 | 109 |
| D | VERT | 46 | 323 |

TABLE 3

| Example | HOR/VERT | Sag (mm) at 1.8 mils | % Solids |
|---|---|---|---|
| A | VERT | 3 | 42.4 |
| B | VERT | 15 | 43.8 |
| C | VERT | 14 | 45.4 |
| D | VERT | 3 | 51.9 |

TABLE 4

| | HOR/VERT | 9 micron Crockmeter Mar | | | 2 micron Crockmeter Mar | | |
|---|---|---|---|---|---|---|---|
| Example | | Gloss | Mar | % Ret. | Gloss | Mar | % Ret. |
| A | HOR | 94 | 43 | 45.7% | 94 | 84.5 | 89.9% |
| B | HOR | 93 | 44.5 | 47.8% | 93 | 84 | 90.3% |
| C | HOR | 83 | 45 | 54.2% | 83 | 75.5 | 91.0% |
| D | HOR | 43 | 20.5 | 47.7% | 43 | 46.5 | 108.1% |

Although the aluminum silicate nanoparticles had a negative impact on initial gloss, they had a positive impact on sag at the 25.1% by volume loading and increased the solids content from 8–10% over similar compositions without the nanoparticles. Also, the nanoparticles had a positive effect on Mar resistance. The high Haze values may be caused by the different refractive index values of the nanoparticles and the resinous ingredients of the clear coat. A better match between the refractive indices should improve the Haze values and perhaps the gloss values.

We claim:

1. A curable film-forming composition that on curing produces an abrasion resistant coating, comprising in a medium (i) 10 to 90 percent by weight based on the total weight of resin solids in the film-forming composition of a crosslinking agent; (ii) 10 to 90 percent by weight based on the total weight of resin solids in the film-forming composition of a polymer containing a plurality of functional groups reactive with the crosslinking agent; and (iii) 20 to 85 percent by volume based on the total volume of the film-forming composition of particles having a mean particle size less than 100 nm, and having an affinity for the medium sufficient to keep the particles suspended therein, said affinity of the particles for the medium being greater than the affinity of the particles for each other, thereby preventing agglomeration of the particles within the medium, and wherein the particles are substantially free of functional groups on the particle surface.

2. The film-forming composition of claim 1 wherein the polymer is present in the film-forming composition in amounts of 25 to 75 percent by weight, based on the total weight of resin solids in the film-forming composition.

3. The film-forming composition of claim 1 wherein the crosslinking agent is present in the film-forming composition in amounts of 25 to 75 percent by weight, based on the total weight of resin solids in the film-forming composition.

4. The film-forming composition of claim 1 wherein the particles are present in the film-forming composition in amounts of 30 to 70 percent by volume based on the total volume of the film-forming composition.

5. The film-forming composition of claim 1 wherein the particles comprise 10 to 70 percent by weight, based on the total weight of the particles, aluminum oxide and 30 to 90 percent by weight, based on the total weight of the particles, silica.

6. The film forming composition of claim 1 wherein the particles (iii) have an index of refraction (n) that is greater than or less than that of the mixture of crosslinking agent (i) and polymer (ii) by an amount less than $\Delta n_{max}$, wherein $\Delta n_{max}$ is determined by the equation:

$$\Delta n_{max} = H/d^2$$

wherein H is an allowable haze factor and is less than 200, and d is the mean particle size of the particles (iii) in nanometers.

7. The film-forming composition of claim 6 wherein H is less than 133.

8. The film-forming composition of claim 1 wherein the particles have a mean particle size less than 20 nm.

9. The film-forming composition of claim 1 wherein the particles have an index of refraction between 1.50 and 1.60.

10. The film-forming composition of claim 1 wherein the particles are substantially free of surface treatment.

11. The film-forming composition of claim 1 wherein the particles are substantially colorless.

12. The film-forming composition of claim 1 wherein the functional groups include a hydroxyl group.

13. A multi-component composite coating composition comprising a pigmented film-forming composition serving as a base coat and a clear film-forming composition serving as a transparent topcoat over the base coat wherein the transparent topcoat is a curable film-forming composition comprising in a medium (i) 10 to 90 percent by weight based on the total weight of resin solids in the clear film-forming composition of a crosslinking agent; (ii) 10 to 90 percent by weight based on the total weight of resin solids in the clear film-forming composition of a polymer containing a plurality of functional groups reactive with the crosslinking agent; and (iii) 20 to 85 percent by volume based on the total volume of the clear film-forming composition of particles having a mean particle size less than 100 nm, and having an affinity for the medium sufficient to keep the particles suspended therein, said affinity of the particles for the medium being greater than the affinity of the particles for each other, thereby preventing agglomeration of the particles within the medium, and wherein the particles are substantially free of functional groups on the particle surface.

14. The multi-component composite coating composition of claim 13 wherein the polymer is present in the clear film-forming composition in amounts of 25 to 75 percent by weight, based on the total weight of resin solids in the clear film-forming composition.

15. The multi-component composite coating composition of claim 13 wherein the crosslinking agent is present in the clear film-forming composition in amounts of 25 to 75 percent by weight, based on the total weight of resin solids in the clear film-forming composition.

16. The multi-component composite coating composition of claim 13 wherein the particles are present in the clear film-forming composition in amounts of 30 to 70 percent by volume, based on the total volume of the clear film-forming composition.

17. The multi-component composite coating composition of claim 13 wherein the particles (iii) have an index of refraction (n) that is greater than or less than that of the mixture of crosslinking agent (i) and polymer (ii) by an amount less than $\Delta n_{max}$, wherein $\Delta n_{max}$ is determined by the equation:

$$\Delta n_{max} = H/d^2$$

wherein H is an allowable haze factor and is less than 200, and d is the mean particle size of the particles (iii) in nanometers.

18. The multi-component composite coating composition of claim 17 wherein H is less than 41.

19. The multi-component composite coating composition of claim 13 wherein the particles comprise 10 to 70 percent by weight, based on the total weight of the particles, aluminum oxide and 30 to 90 percent by weight, based on the total weight of the particles, silica.

20. The multi-component composite coating composition of claim 13 wherein the particles have a mean particle size less than 50 nm.

21. The multi-component composite coating composition of claim 13 wherein the particles have an index of refraction between 1.50 and 1.60.

22. The multi-component composite coating composition of claim 13 wherein the particles are substantially free of surface treatment.

23. A coated substrate in which the curable coating composition of claim 1 is applied to the substrate and cured to form a cured coating; the cured coating having a thickness of at least 5 microns.

24. A coated substrate in which the multi-component composite coating composition of claim 13 is applied to the substrate and cured to form a cured coating; the cured coating having a thickness of at least 5 microns.

25. The film-forming composition of claim 13 wherein the functional groups include a hydroxyl group.

26. A curable film-forming composition that on curing produces an abrasion resistant coating, comprising in a medium (i) 10 to 90 percent by weight based on the total weight of resin solids in the film-forming composition of a crosslinking agent; (ii) 10 to 90 percent by weight based on the total weight of resin solids in the film-forming composition of a polymer containing a plurality of functional groups reactive with the crosslinking agent; and (iii) 20 to 85 percent by volume based on the total volume of the film-forming composition of particles having a mean particle size less than 100 nm, and having an affinity for the medium sufficient to keep the particles suspended therein, said affinity of the particles for the medium being greater than the affinity of the particles for each other, thereby preventing agglomeration of the particles within the medium, and wherein the particles are substantially free of surface treatment.

27. The film-forming composition of claim 26 wherein the polymer is present in the film-forming composition in amounts of 25 to 75 percent by weight, based on the total weight of resin solids in the film-forming composition.

28. The film-forming composition of claim 26 wherein the crosslinking agent is present in the film-forming composition in amounts of 25 to 75 percent by weight, based on the total weight of resin solids in the film-forming composition.

29. The film-forming composition of claim 26 wherein the particles are present in the film-forming composition in amounts of 30 to 70 percent by volume based on the total volume of the film-forming composition.

30. The film-forming composition of claim 26 wherein the particles comprise 10 to 70 percent by weight, based on the total weight of the particles, aluminum oxide and 30 to 90 percent by weight, based on the total weight of the particles, silica.

31. The film forming composition of claim 26 wherein the particles (iii) have an index of refraction (n) that is greater than or less than that of the mixture of crosslinking agent (i) and polymer (ii) by an amount less than $\Delta n_{max}$, wherein $\Delta n_{max}$ is determined by the equation:

$$\Delta n_{max} = H/d^2$$

wherein H is an allowable haze factor and is less than 200, and d is the mean particle size of the particles (iii) in nanometers.

32. The film-forming composition of claim 31 wherein H is less than 133.

33. The film-forming composition of claim 26 wherein the particles have a mean particle size less than 50 nm.

34. The film-forming composition of claim 26 wherein the particles have an index of refraction between 1.50 and 1.60.

35. The film-forming composition of claim 26 wherein the particles are substantially free of hydroxyl functional groups on the particle surface.

36. A multi-component composite coating composition comprising a pigmented film-forming composition serving as a base coat and a clear film-forming composition serving as a transparent topcoat over the base coat wherein the transparent topcoat is a curable film-forming composition comprising in a medium (i) 10 to 90 percent by weight based on the total weight of resin solids in the clear film-forming composition of a crosslinking agent; (ii) 10 to 90 percent by weight based on the total weight of resin solids in the clear film-forming composition of a polymer containing a plurality of functional groups reactive with the crosslinking agent; and (iii) 20 to 85 percent by volume based on the total volume of the clear film-forming composition of particles having a mean particle size less than 100 nm, and having an affinity for the medium sufficient to keep the particles suspended therein, said affinity of the particles for the medium being greater than the affinity of the particles for each other, thereby preventing agglomeration of the particles within the medium, and wherein the particles are substantially free of surface treatment.

37. The multi-component composite coating composition of claim 36 wherein the polymer is present in the clear film-forming composition in amounts of 25 to 75 percent by weight, based on the total weight of resin solids in the clear film-forming composition.

38. The multi-component composite coating composition of claim 36 wherein the crosslinking agent is present in the clear film-forming composition in amounts of 25 to 75 percent by weight, based on the total weight of resin solids in the clear film-forming composition.

39. The multi-component composite coating composition of claim 36 wherein the particles are present in the clear film-forming composition in amounts of 30 to 70 percent by volume, based on the total volume of the clear film-forming composition.

40. The multi-component composite coating composition of claim 36 wherein the particles (iii) have an index of refraction (n) that is greater than or less than that of the mixture of crosslinking agent (i) and polymer (ii) by an amount less than $\Delta n_{max}$, wherein $\Delta n_{max}$ is determined by the equation:

$$\Delta n_{max} = H/d^2$$

wherein H is an allowable haze factor and is less than 200, and d is the mean particle size of the particles (iii) in nanometers.

* * * * *